United States Patent [19]
Strnad

[11] 3,713,635
[45] Jan. 30, 1973

[54] OXY-ACETYLENE CUTTING TORCH-HOLDER AND GUIDE

[76] Inventor: Emil Strnad, 280 Lafayette Pkwy., Lexington, Ky.

[22] Filed: Feb. 26, 1971

[21] Appl. No.: 119,168

[52] U.S. Cl. ............................................266/23 HH
[51] Int. Cl. ..................................................B23k 7/06
[58] Field of Search....266/23 D, 23 E, 23 H, 23 HH, 266/23 K, 23 L, 23 M, 23 P, 23 R, 23 N, 23 F; 33/21 C, 23 C, 23 D, 23 R

[56] References Cited

UNITED STATES PATENTS

| | | | |
|---|---|---|---|
| 1,998,729 | 4/1935 | Mathey | 266/23 N |
| 2,594,191 | 4/1952 | Mathey | 33/21 C |
| 2,432,240 | 12/1947 | Kelp | 266/23 N |
| 2,583,002 | 1/1952 | Maxon | 266/23 F |
| 2,828,545 | 4/1958 | Ely | 33/21 C |
| 3,172,938 | 3/1965 | Schwartz | 266/23 D |

Primary Examiner—J. Spencer Overholser
Assistant Examiner—John S. Brown
Attorney—Berman, Davidson & Berman

[57] ABSTRACT

A torch guide consisting of a rail which can be clamped onto a work piece adjacent an intended path of cut, a carriage movably supported on the rail, and a bracket on the carriage to receive a cutting torch and support the torch nozzle in cutting position with respect to the work piece. The bracket can be angularly adjusted to cut a bevel, and the rail can be pivotally held to cut a circular arc.

8 Claims, 6 Drawing Figures

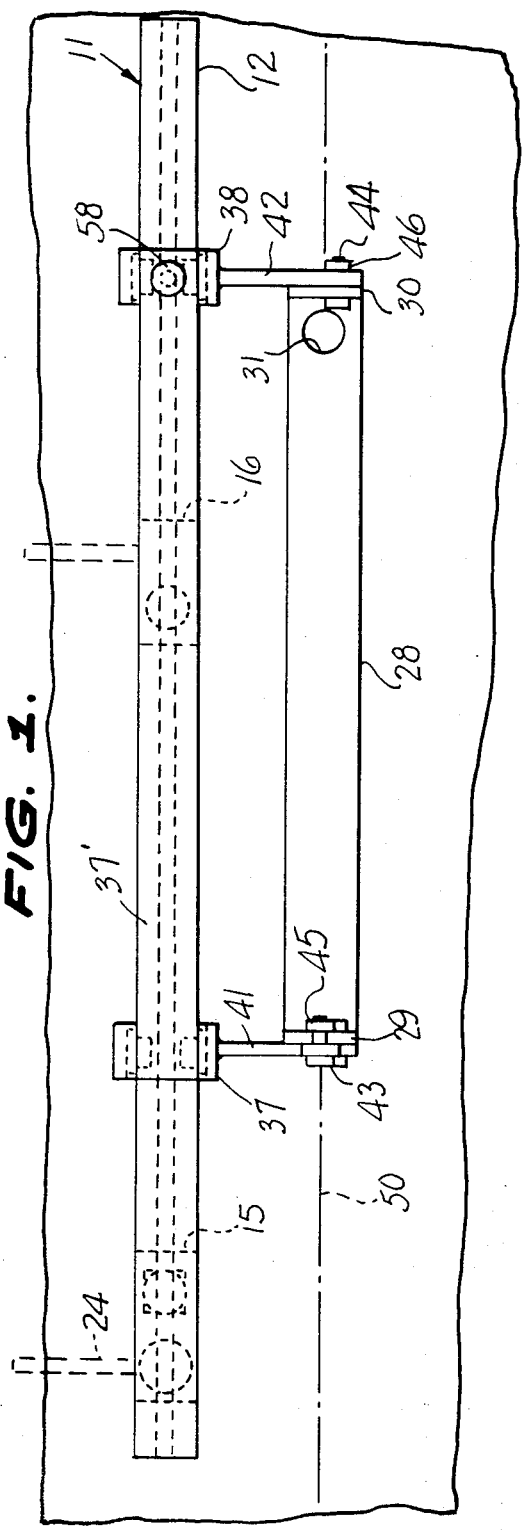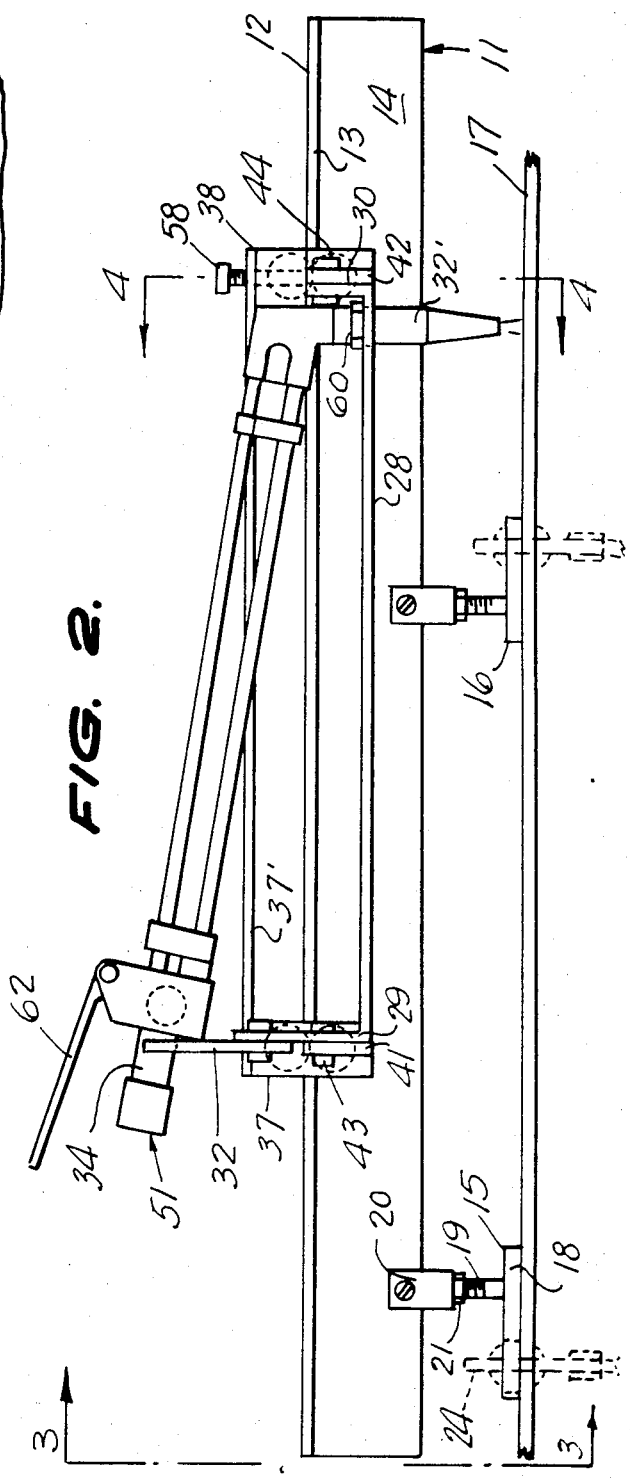

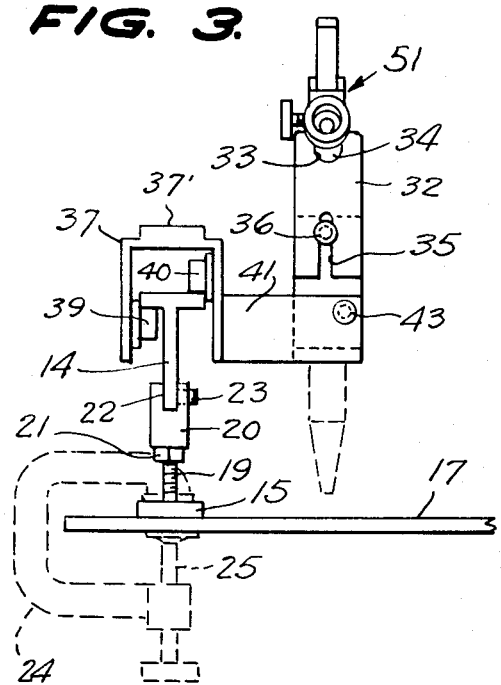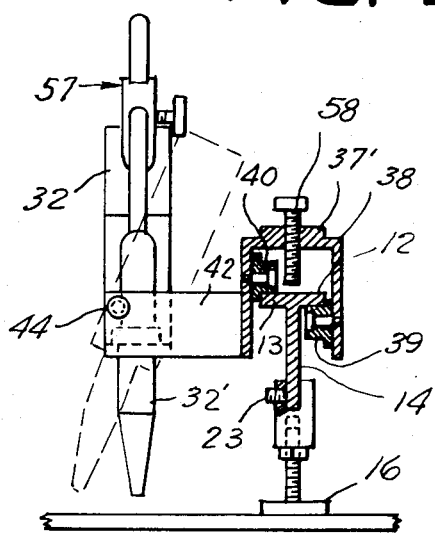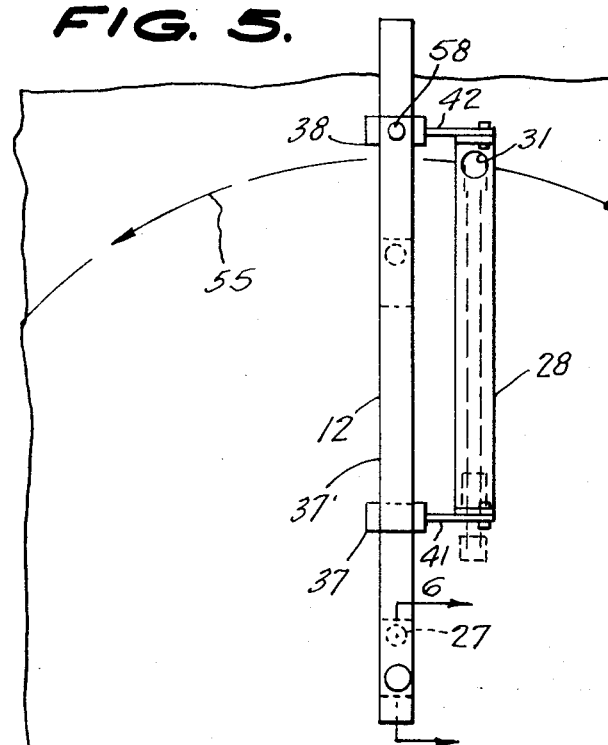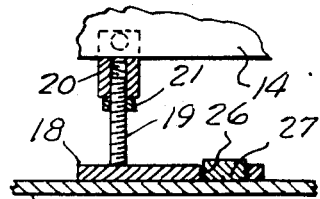

3,713,635

OXY-ACETYLENE CUTTING TORCH-HOLDER AND GUIDE

This invention relates to supports for cutting torches, and more particularly to a torch guide assembly for supporting a cutting torch in cutting position with respect to a work piece and for guiding the movement of the torch along an intended path of travel.

The main object of the invention is to provide a novel and improved torch guide assembly which is simple in construction, which is easy to set up for use, and which accurately supports a cutting torch in proper cutting position for the intended cut.

A further object of the invention is to provide an improved torch guide assembly which can be employed either to guide the movement of a cutting torch along a linear path of travel or which can be alternatively employed to support the cutting torch for movement in a circular arc, the assembly involving inexpensive components, being compact in size, being easy to adjust for a desired cutting action, and being arranged so that it can be adjusted to cut a bevel if so desired.

Further objects and advantages of the invention will become apparent from the following description and claims and from the accompanying drawings, wherein:

FIG. 1 is a top plan view of an improved torch-guide assembly constructed in accordance with the present invention.

FIG. 2 is a side elevational view of the assembly of FIG. 1, shown with a cutting torch mounted in the assembly.

FIG. 3 is an end elevational view taken substantially on the line 3—3 of FIG. 2.

FIG. 4 is a transverse vertical cross-sectional view taken substantially on the line 4—4 of FIG. 2.

FIG. 5 is a top-plan view, to a reduced scale, showing the torch-guide assembly set up to cut a circular arc.

FIG. 6 is an enlarged fragmentary vertical cross-sectional detail view taken substantially on line 6—6 of FIG. 5.

Referring to the drawings, 11 generally designates an improved torch-guide assembly according to the present invention. The assembly 11 comprises an elongated support rail member 12 having the top flange 13 and the vertical web 14. The support rail member 12 is provided with a pair of supporting foot assemblies 15 and 16 adapted to support the rail member 12 on a work piece 17 adjacent an intended path of cut. Thus, the foot assembly 15 comprises a flat base plate 18 on which is welded an upstanding threaded stud member 19 which threadedly engages in the bottom portion of a cylindrical block member 20 and is locked thereto by a lock nut 21, as shown in FIG. 6. The top end portion of the block 20 is formed with a transverse groove 22 which receives the lower portion of web 14, the upper portion of block member 20 being provided with a set screw 23 which is clampingly engaged with web 14 so as to lock the block member 20 rigidly thereto. The foot assembly 15 may be clamped to the work piece 17 by means of a conventional C-clamp 24, as illustrated in dotted view in FIG. 3. Thus, the C-clamp receives an edge of the work piece 17 with its top arm engaging on the flat plate 18 and its bottom arm extending beneath the work piece, with the screw clamping element 25 thereof engaged with the bottom surface of the work piece.

One end portion of the flat plate 18 is provided with a square aperture 26 which may be employed at times to receive a circular stud or boss 27 welded on to the work piece 17, for example, where it is desired to make a circular cut and to employ the boss member 27 as a center pivot, as will be presently described.

The other foot assembly 16 is similar to the foot assembly 15, although it is not provided with a pivot aperture. The flat base portion of the assembly 16 can be clampingly secured to the work piece 17 by a C-clamp in the same manner as previously described in connection with the foot assembly 15.

Designated at 28 is a torch-rest member comprising an elongated bar having upstanding opposite ends 29 and 30. The bar 28 is formed adjacent the upstanding end 30 with a circular aperture 31 adapted to receive the nozzle 32' of a torch in the manner illustrated in FIG. 2. Adjustably secured to the upstanding opposite end portion 29 of the bar 28 is an upstanding rectangular plate member 32 formed at its top end with an upwardly facing notch 33 adapted to receive the shank portion 34 of the torch assembly, as illustrated in FIGS. 2 and 3. As shown in FIG. 3, the lower portion of the plate 32 is formed with a vertical slot 35 through which extends a clamping bolt 36 which clampingly secures the plate member to the upstanding end element 29 of rest 28. Thus, the notched plate 32 may be secured in vertically adjusted position and locked therein by tightening the clamping bolt 36.

Engaging over the flange 13 of support rail member 12 are a pair of inverted U-shaped members 37 and 38 integrally connected by a longitudinal bar 37', each member being provided with rollers engaged above and below the top flange 13 in positions to support the member 37 against tilting relative to flange 13. Thus, the outer arm of each of the U-shaped members 37 and 38 is provided with a roller 39 engaging under the outer portion of top flange 13 and the inner arm of each of said inverted U-shaped members is provided with a roller 40 engaging on the top surface of the inner portion of flange 13, as shown in FIG. 4. As shown in FIG. 4, the rollers are suitably shouldered so that the lower corner edge of the outer portion of flange 13 is received by the outer roller 39 and the upper corner edge of the inner portion of said flange is received by the inner rollers 40.

Rigidly secured to the respective members 37 and 38 at their inner arms are the laterally extending arms 41 and 42 which are respectively pivotally connected at 43 and 44 to the upstanding end portions of the rest bar 28. The pivot connections 43 and 44 comprise respective bolts which are longitudinally aligned on an axis parallel to the support rail member 12, and said bolts are located adjacent the outer edges of the upstanding end elements 29 and 30, as is clearly shown in FIG. 3, to allow for maximum pivotal adjustment of the rest bar 28 around the axis of the pivot bolts 43 and 44. The bolts may be locked by means of their associated nuts 45 and 46 to clamp the rest member 28 in its selected angular position.

In operation, the assembly 11 is clamped on to the work piece 17 in the manner above described, adjacent to the intended line of cut shown at 50 in FIG. 1, with the rail member 12 parallel to the line of cut and spaced therefrom so that the torch nozzle 32', when inserted through the aperture 31, will coincide with the line of cut. The torch assembly, shown at 51, may then be mounted on the rest bar 28 with the nozzle 32' engaged through the circular aperture 31 and with the shank portion 34 of the torch assembly engaged in the notch 33 of plate 32, the plate 32 having been threadedly adjusted to the proper height so that the nozzle 32' is supported in a substantially vertical depending position, as shown in FIG. 2. With the shank portion 34 of the torch assembly 51 engaged in the notch 33, the torch assembly 51 will then be properly oriented to make a desired vertical cut along the line 50 when the assembly is moved longitudinally along the support rail 12.

If a bevel cut is desired, the rest bar 28 is adjusted angularly around the axis defined by the aligned pivot bolts 43 and 44 and locked in a different position by means of the associated clamping nuts 45 and 46. This supports the nozzle 32' in the desired angular position, as shown, for example, in dotted view in FIG. 4, for making the required bevel cut.

When it is desired to make a circular arcuate cut, such as along the arcuate path 55 in FIG. 5, a circular boss 27 is welded to the work piece, shown at 56, at the center of the intended arcuate cut. The boss 27 is then engaged in the aperture 26 of the foot plate 18 in the manner illustrated in FIG. 6, with the foot plate resting on the work piece 56. As shown in FIG. 4, the top wall of the inverted U-shaped member 38 is provided with a clamping screw 58. This screw may be employed to clamp the member 38 in a fixed position relative to the supporting rail 12. Said fixed position will be in accordance with the desired radius of cut, namely, the radial distance between the upstanding pivot boss 27 and the intended arcuate line of cut 55. The nozzle 32' will then be supported in the proper position for the desired arcuate cut.

As will be readily apparent, the height of the rail member 12 can be adjusted relative to the work piece by adjusting the positions of the block members 20 on their threaded supporting studs 19. This enables the rail to be adjusted to the proper height to provide the correct spacing between the discharge end of nozzle 32' and the work piece. As shown in FIG. 2, the nozzle 32' will be supported on the rest bar 28 by the engagement of the nozzle flanged nut 60 with the margin of the aperture 31. The torch assembly 51 is therefore supported in a convenient position for making the desired cut, with the torch control lever 62 readily accessible as the nozzle 32' is moved along the intended line of cut.

While a specific embodiment of an improved torch-guide assembly has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A torch-guide assembly comprising an elongated support rail member, means to mount said support rail member on a work piece adjacent an intended path of cut, a torch rest member, means to mount said rest member on said elongated support rail member for guided support therealong, said rest member having an aperture to receive the nozzle of a cutting torch, an upstanding bracket element on said rest member spaced from said aperture and having a notch to supportingly receive the shank portion of the cutting torch, and means pivotally connecting said rest member to said means to mount the rest member on the support rail member for adjustment on an axis parallel to the support rail member for obtaining a beveled cut, wherein said rest member comprises an elongated bar having upstanding opposite ends, said bracket element comprising a plate member secured to one of said ends, said notch being formed in the top end of the plate member, and said aperture being formed in the bar adjacent its other end.

2. The torch-guide assembly of claim 1, and wherein said means to mount the rest member on the support rail member comprises respective inverted U-shaped members engaged over the rail member and having laterally extending arms pivotally connected to said upstanding opposite ends.

3. The torch-guide assembly of claim 2, and means to adjust the height of said plate member relative to said one of the ends of the bar.

4. The torch-guide assembly of claim 3, and wherein said rail member is substantially T-shaped with a top flange and said inverted U-shaped members are each provided with rollers engaged above and below said top flange in positions to support said bar relative to said rail member.

5. The torch-guide assembly of claim 4, and means on at least one of said inverted U-shaped members clampingly engagable with said top flange to at times lock the rest member to the rail member.

6. The torch-guide assembly of claim 5, and a plurality of depending spaced supporting feet secured to said rail member, at least one of said feet having a flat bottom portion formed with a pivot aperture.

7. The torch-guide assembly of claim 6, and wherein the pivotal connections of the arms to the upstanding ends of the bar are located adjacent the outer edges of said upstanding ends.

8. The torch-guide assembly of claim 7, and wherein said supporting feet are threadedly secured to the rail member for adjusting the height of said rail member.

* * * * *